United States Patent [19]

Nakashima et al.

[11] Patent Number: 4,712,972
[45] Date of Patent: Dec. 15, 1987

[54] CABLE SUPPORTING ARRANGEMENT IN INDUSTRIAL ROBOTS

[75] Inventors: Seiichiro Nakashima; Kenichi Toyoda, both of Hino; Shigemi Inagaki, Kokubunji; Kazuhisa Otsuka, Hino, all of Japan

[73] Assignee: Fanuc Ltd., Yamanashi, Japan

[21] Appl. No.: 815,082

[22] PCT Filed: Apr. 12, 1985

[86] PCT No.: PCT/JP85/00193

§ 371 Date: Feb. 12, 1986

§ 102(e) Date: Feb. 12, 1986

[87] PCT Pub. No.: WO85/04615

PCT Pub. Date: Oct. 24, 1985

[30] Foreign Application Priority Data

Apr. 13, 1984 [JP] Japan ................. 59-73027

[51] Int. Cl.$^4$ ............................ B25J 11/00
[52] U.S. Cl. ....................... 414/744 R; 414/918; 901/50; 248/52
[58] Field of Search ............. 414/680, 735, 730, 4, 414/744, 918, 7; 901/50, 15, 22-24, 27-29, 37, 38, 14; 248/52, 68.1, 74.3, 55

[56] References Cited

U.S. PATENT DOCUMENTS

| 3,157,376 | 11/1964 | Merker et al. | 248/52 X |
| 3,716,986 | 2/1973 | Cork et al. | 248/52 X |
| 3,963,205 | 6/1976 | Hageman | 248/55 |
| 3,980,262 | 9/1976 | Lee | 248/55 X |
| 3,994,373 | 11/1976 | Loos et al. | 248/52 X |
| 4,017,046 | 4/1977 | Hicks | 248/55 |
| 4,116,499 | 9/1978 | Laurizio | 248/55 X |
| 4,659,279 | 4/1987 | Akeel et al. | 901/50 X |

FOREIGN PATENT DOCUMENTS

| 41-6092 | 3/1966 | Japan . |
| 56-15885 | 4/1981 | Japan . |
| 58-191992 | 12/1983 | Japan . |
| 58-184293 | 12/1983 | Japan . |

Primary Examiner—Robert J. Spar
Assistant Examiner—Jay I. Alexander
Attorney, Agent, or Firm—Armstrong, Nikaido, Marmelstein & Kubovcik

[57] ABSTRACT

The cable supporting arrangement inside the base body of an industrial robot supports at least a cable (14) led through the interior of the base body (10) having a cylindrical inner surface (11) into the movable body (13) provided atop the base body pivotably about the axis (X) of the base body. An inner cylinder (15) is provided and fixed concentrically inside the base body. An annular space is defined between the inner cylinder and the base body. The resilient strip members (19, 20) have one end (21, 30) thereof fixed to the inner surface of the base body, and the other end (22, 31) fixed to the cylindrical outer face (16) of the inner cylinder. The strip member is curved at a selected portion such that the strip member sections before and after the curved portion are opposite to each other, and is forced under its own resilience onto the inner surface of the base body and the outer face of the inner cylinder when the movable body is in a selected pivoting position. A plurality of cable holders (25, 32) are disposed and spaced from each other on one side of the strip member along the length of the latter to hold the cable.

7 Claims, 5 Drawing Figures

CABLE SUPPORTING ARRANGEMENT IN INDUSTRIAL ROBOTS

TECHNICAL FIELD

The present invention relates to a cable supporting arrangement intended for use in industrial robots, and more particularly, to an arrangement for supporting cables which are led through the interior of the base body of an industrial robot into a movable body provided pivotably on the base body.

BACKGROUND ART

Generally, in industrial robots having a base body and a movable body pivotably provided thereon, the power cable, signal cable, etc. are led into the movable body through the interior of the base body. As the movable body is pivoted, the cables are moved in that pivoting direction. Therefore, there should be normally housed in the base body a length of cables large enough to ensure smooth movement of the movable body.

Referring now to FIGS. 1 and 2, a conventional industrial robot has a body base with a cylindrical inner surface and having a guide cone 2 provided concentrically therein. A movable body 3 is pivotably provided atop the base body 1. A cable 4 led into the movable body 3 through the interior of the base body 1 is wound about one turn about the guide cone 2. Usually, a plurality of power and signal cables (not shown for simplicity of the illustration) is housed in the base body in a similar manner.

In the case of such conventional industrial robots, the cable 4 is freely movable in the space defined between the inner wall of the base body 1 and the guide cone 2, so the cable 4, inner wall of the base body 1 and the guide cone 2 rub against each other. In this way, the surface of the cable 4 is likely to be abraded. Also, where plural cables are housed inside the base body 1, they entwine with each other and are bent beyond their bending limits, possibly resulting in damage to them.

DISCLOSURE OF THE INVENTION

The present invention has the object to provide a cable supporting arrangement for use in an industrial robot, which can support the cables led into the movable body of the robot, through the interior of the base body, in such a manner that they do not incur any excessive bending stress and surface abrasion.

The above object is attained by providing, according to the present invention, a cable supporting arrangement for use in an industrial robot comprising a base body with a cylindrical inner surface and a movable body mounted atop the base body pivotably about the axis of the latter, which supports inside the base body at least a cable led through the interior of the base body into the movable body, comprising an inner cylinder fixed to the movable body as disposed concentrically within the base body so that an annular space is defined between the inner cylinder and the base body; a resilient strip member having one end thereof fixed to the inner surface of the base body and the other end fixed to the cylindrical outer face of the inner cylinder, the strip member having one side thereof socurved at a selected portion thereof that portions of the strip member before and after the curved portion are faced to each other, and the strip member being forced under its own resilience onto the inner surface of the base body and outer face of the inner cylinder; and a plurality of cable holders disposed on one side of the strip member, spaced from each other along the length of the strip member, to hold the cable.

In this cable supporting arrangement according to the present invention, the cables are held by means of the cable holders to the strip member forced onto the inner surface of the base body and the outer face of the inner cylinder. Therefore, abrasion of the surface of the cable can be prevented. Also, where plural cables are to be supported, they can be surely prevented from entwining with each other. The strip member is curved along the cylindrical inner surface of the base body and the cylindrical outer face of the inner cylinder of the movable body, respectively. Further, the strip member is curved generally semicircularly between the inner surface of the base body and the outer face of the inner cylinder. The minimum bend radius of the semicircular curve of the strip member depends on the spacing between the base body and the inner cylinder, and is maintained nearly constant under the action of its own resilience. Therefore, the bend radius of the cable also depends on the spacing between the base body and the inner cylinder and is maintained nearly constant. Thus, the cable can be prevented from being bent beyond the bending limits.

BRIEF DESCRIPTION OF THE DRAWINGS

The present invention may be more fully understood from the ensuing description, made by way of example, of the preferred embodiments of the invention with reference to the drawings, in which.

BEST MODE OF CARRYING OUT THE INVENTION

Figure 1:
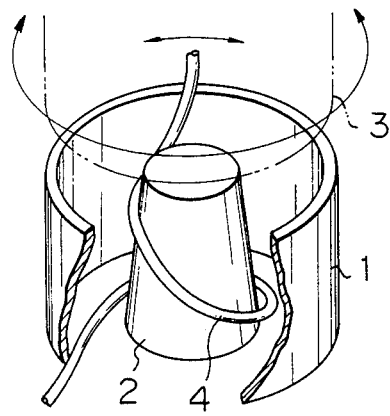
FIG. 1 is a partially fragmentary, schematic perspective view of the essential portion of a prior art industrial robot.
Figure 2:
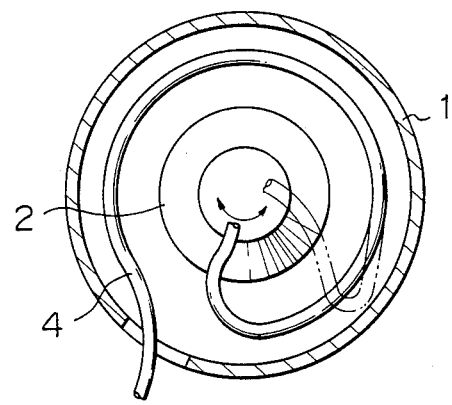
FIG. 2 is a cross sectional view of the essential portion of the industrial robot shown in FIG. 1.
Figure 3:
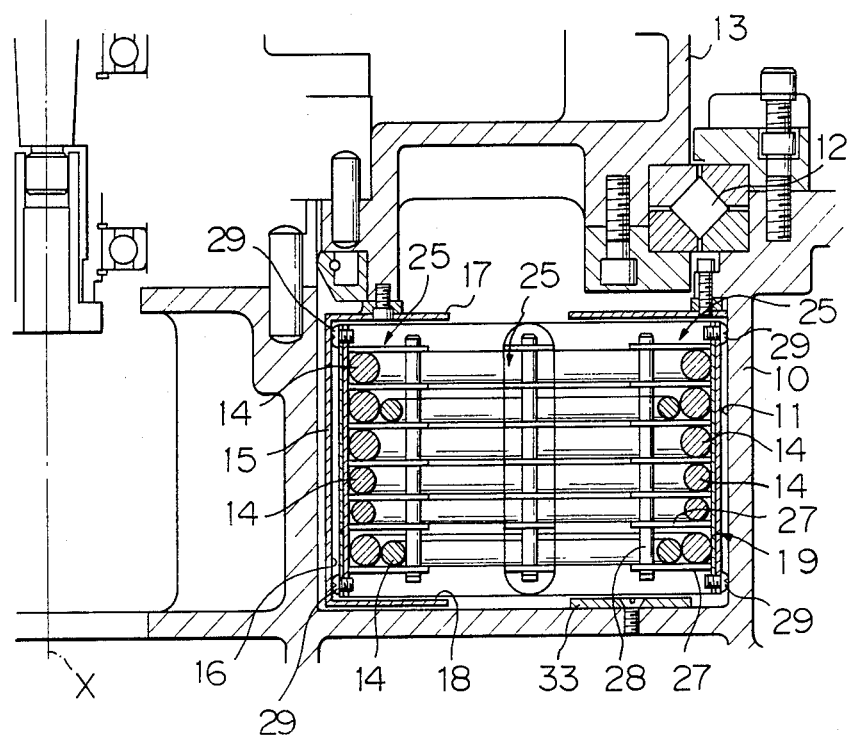
FIG. 3 is a longitudinal sectional view of the essential portion of one embodiment of the cable supporting arrangement used in an industrial robot, according to the present invention.
Figure 4:
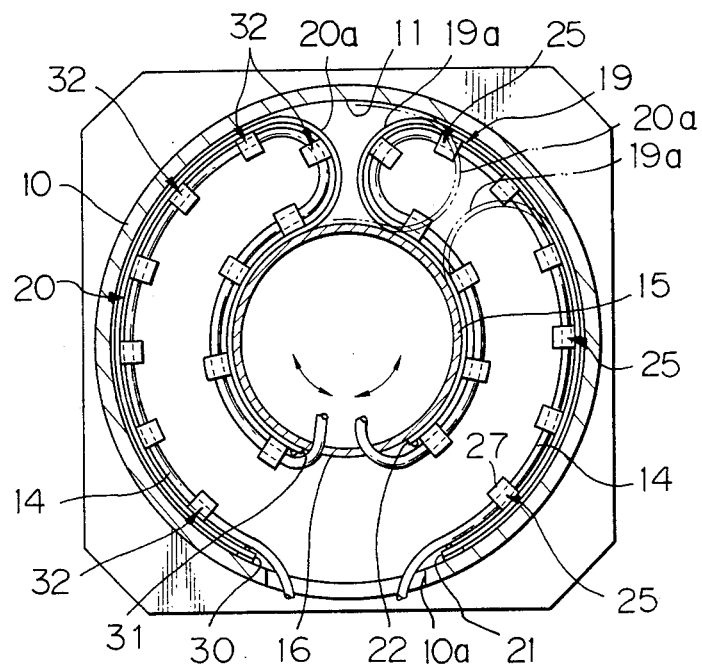
FIG. 4 is a schematic cross sectional view of the cable supporting arrangement shown in FIG. 3.
Figure 5:
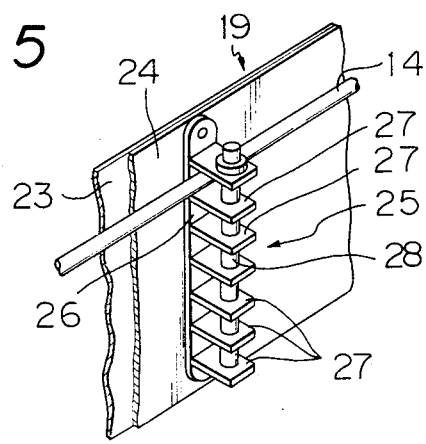
FIG. 5 is a perspective view of the essential portion of the cable supporting arrangement shown in FIG. 3.

Referring now to FIG. 3 to 5 showing a preferred embodiment of the invention, an industrial robot comprises a base body 10 having a cylindrical inner surface 11. The base body 10 has mounted at the top thereof a movable body 13 which is supported pivotably in relation to the base body 10 about the center axis of the base body 10 by means of a bearing member, for example, a cross bearing 12. In this embodiment, eight cables 14 are led into the movable body 13 through the inside of the base body 10. The base body 10 has formed therein for the cables 14 a lead-in opening 10a opened in the inner surface thereof. Disposed within the base body 10 is an inner cylinder 15 fixed to the bottom of the movable body 13 concentrically with the inner cylindrical surface 11 of the base body 10. Thus, an annular space is defined between the outer circumferential face of the inner cylinder 15 and the inner circumferential surface 11 of the base body 10. The inner cylinder 15 has provided at the upper and lower ends thereof annular flanges 17 and 18, respectively, which extend outwardly in the radial direction.

In this embodiment, there are disposed in the annular space between the base body 10 and the inner cylinder 15 two resilient strip members 19 and 20. The strip member 19 has one end 21 thereof fixed to the inner cylindrical surface 11 of the base body 10 at a position near the lead-in opening 10a and the other end 22 fixed to the cylindrical outer face 16 of the inner cylinder 15. The strip member 19 is curved at a selected portion thereof so that the one end 21 and other end 22 are opposite to each other radially of the base body 10. Also the strip member 19 is curved under its own resilience along the inner surface 11 of the base body 10 and the outer face 16 of the inner cylinder 15. Furthermore, the strip member 19 is curved generally semicircularly between the base body 10 and the inner cylinder 15.

As apparent from FIG. 5, this embodiment uses the strip member 19 made of a stainless steel sheet 23 for use in making springs, and a resin sheet 24 which is, for example, nylon sheet, which are secured together by being superimposed on each other.

The strip member 19 has provided on one side thereof, namely, on the surface of the resin sheet 24, a plurality of cable holders 25 spaced longitudinally of the strip member 19. Each of the cable holders 25 comprises a mount plate 26 extending perpendicularly to the longitudinal direction of the strip member 19, a plurality of shelvings 27 fixed as spaced from each other on the mount plate 26, and a pin 28 extending through and penetrating the shelvings 27 and which is removable from the shelvings 27. As shown in FIG. 3, the mount plate 26 is fixed to one side of the strip member 19 by means of a screw 29 penetrating through the strip member 19. The cable holder 25 has the surface made of a resin such as polytetrafluoroethylene, etc. The resin may be coated on the surface of the cable holder 25. However, the cable holders 25 may be made of the resin. Some of the cables 14 are inserted between adjacent shelvings of the cable holder 25 and supported in parallel along the lengthwise direction of the strip member 19.

The strip member 20 has the same construction as the strip member 19 described in the foregoing. Symmetrically with the strip member 19, the strip member 20 is disposed in the space defined by the base body 10 and the inner cylinder 15 having one end 30 thereof fixed to the inner surface 11 of the base body 10 at a position near the cable lead-in opening 10a and the other end 31 fixed to the outer face 16 of the inner cylinder 15. The strip member 20 has also provided thereon cable holders 32 of the same construction as the cable holders 25 and functioning in the same manner. The other cables 14 are inserted between the adjacent shelvings of the cable holder 32 and are supported in parallel along the lengthwise direction of the strip member 20.

The lower flange 18 of the inner turning cylinder 15 has coated on the upper side thereof a resin such as polytetrafluoroethylene, and the base body has mounted on the upper side of the bottom wall thereof a ring-shaped guide plate 33 made of a resin such as Delrin.

In the industrial robot having the cable supporting arrangement of the above-mentioned construction, since the strip members 19 and 20 have resilience, they are always forced under their own resilience onto the cylindrical inner surface 11 of the base body 10 and the cylindrical outer face 16 of the inner cylinder 15. Also the return portions 19a and 20a of the strip members 19 and 20 are maintained in the semicircular shape taking the width of the cable space as its diameter under their own resilience. As the movable body 13 pivots about the center axis X, the inner cylinder 15 also pivots in the same direction along with the moving body 13. Consequently, the strip members 19 and 20 have their respective ends 22 and 31 moved in the pivoting direction of the inner cylinder 15. In this embodiment, since the length of the strip members 19 and 20 is fixed, the return portions 19a and 20a of the strip members 19 and 20, respectively, are displaced as shown by two-dot dash line in FIG. 4, while the curvatures of the return portions 19a and 20a and other curved portions of the strip members 19 and 20, respectively, are maintained constant. The cables 14 take a minimum curvature at the return portions 19a and 20a of the strip members 19a and 20a, respectively; however, since the curvature is maintained at a magnitude depending on the spacing between the base body 10 and the inner cylinder 15, an excessive bending stress will not be applied to the cables 14. Also, since the cables are supported longitudinally of the strip members 19 and 20 by means of the cable holders 25 and 32, possible abrasion at the surface of the cables 15 can be considerably reduced.

In this embodiment, the, two strip members 19 and 20 are fixed to the base body 10 and inner cylinder 15 so that they are symmetrical with each other in the space between the base body 10 and inner cylinder 15 when the movable body 13 is in a predetermined pivoting reference position, namely, at the point of origin. Therefore, while the movable body 13 is pivoting, the strip members 19 and 20 will not interfere with each other. Owing to this construction, many cables 14 can be disposed and well balanced in the base body 10. Also since the strip members 19 and 20 have their respective ends 21 and 30 fixed near the lead-in opening 10a, sagging of the cables 14 inside the base body 10 can be surely prevented.

In this embodiment, the strip members 19 and 20 have one side thereof made of a resin such as nylon, and the cable holders 25 and 32 have their respective surface coated with a resin such as polytetrofluoroethylene; therefore, the cables 14 can be more effectively prevented from being abraded at their surfaces.

According to this embodiment, the lower ends of the strip members 19 and 20 slide on the upper face of the lower flange 18 of the inner cylinder 15 and the upper face of a guide plate 33 as the movable body 13 pivots. However, since the lower flange 18 has coated on the upper face thereof a resin such as polytetrafluoroethylene and also the guide plate 33 is made of a resin, the return portions 19a and 20a of the strip members 19 and 20, respectively, move smoothly along the lower flange 18 of the inner cylinder 15 and the guide plate 33.

One embodiment of the invention has been described in the foregoing. However, the present invention is not limited only to that embodiment but can be variously embodied without departing from the scope and spirit of the claims given later. Concerning the strip member, for example, a single strip member may be provided in the space between the base body and the inner cylinder of the moving body. Also, the strip member may be a resilient metal sheet on which a resin such as polytetrafluoroethylene is coated. The cable holder may be one which supports a cable or cables and may be embodied in various forms.

We claim:

1. A cable supporting arrangement for use in a base body of an industrial robot with a cylindrical inner surface and a movable body mounted atop the base body pivotally about an axis of the latter, which supports inside the base body at least a cable led through the interior of the base body into the movable body, comprising:
   an inner cylinder fixed to said movable body and disposed concentrically within said base body so that an annular space is defined between said inner cylinder ans said base body;
   a resilient strip member having one end thereof fixed to the cylinderical inner surface of said base body and the other end fixed to the cylindrical outer face of said inner cylinder, said strip member being formed of sheet material having a substantial lateral dimension extending in the direction of said axis and having one side thereof so curved at a selected portion thereof that portions of the strip member before and after the curved portion are facing each other, said strip member being forced under its own resilience onto the inner surface of said base body and the outer face of said inner cylinder; and
   a plurality of cable holders disposed on said one side of said strip member and spaced from each other along the length of said strip member to hold said cable.

2. A cable supporting arrangement according to claim 1, wherein said base body has formed therein a cable lead-in opening which opens at the cylindrical inner surface, said strip member having one end thereof fixed to said base body at a position near said cable lead-in opening and the other end thereof fixed to said cylindrical outer face of said inner cylinder in a position where it is generally opposite to the one end of said strip member when said movable body is in a predetermined pivoting reference position.

3. A cable supporting arrangement according to claim 1 or 2, further comprising another strip member which is of a same construction as the resilient strip member, the strip members being symmetrical with each other when said movable body is in the predetermined pivoting reference position.

4. A cable supporting arrangement according to claim 1, wherein said strip member has at least said one side thereof made of a resin.

5. A cable supporting arrangement according to claim 1, wherein said cable holders are formed to hold a plurality of cables which are held in parallel by each of said holders perpendicularly to the lengthwise direction of the cables.

6. A cable supporting arrangement according to claim 5, wherein each of said holders comprises a plurality of shelvings disposed and spaced perpendicularly to the lengthwise direction of the strip member along the one side of the latter and a removable pin penetrating through said shelvings, said cables being inserted between two adjacent shelvings.

7. A cable supporting arrangement according to claim 1, wherein said holders have at least the cable holding faces made of a resin.

* * * * *